(12) United States Patent  
Higuchi et al.

(10) Patent No.: US 8,615,339 B2
(45) Date of Patent: Dec. 24, 2013

(54) CONTROL DEVICE OF ELECTRIC VEHICLES

(75) Inventors: Yutaka Higuchi, Chiyoda-ku (JP); Toshiaki Takeoka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 802 days.

(21) Appl. No.: 11/997,933

(22) PCT Filed: Apr. 12, 2006

(86) PCT No.: PCT/JP2006/307753
§ 371 (c)(1),
(2), (4) Date: Aug. 24, 2010

(87) PCT Pub. No.: WO2007/122671
PCT Pub. Date: Nov. 1, 2007

(65) Prior Publication Data
US 2010/0318248 A1 Dec. 16, 2010

(51) Int. Cl.
*B60L 11/00* (2006.01)
*H05B 37/02* (2006.01)

(52) U.S. Cl.
USPC ............................................ 701/22; 315/219

(58) Field of Classification Search
USPC .................... 701/22; 315/219, 362, 313, 307; 363/121, 50, 20, 25, 126, 61, 125, 127, 363/12–18, 21, 39, 24, 40, 41; 322/7, 28, 322/29, 25
See application file for complete search history.

(56) References Cited

U.S. PATENT DOCUMENTS

RE38,470 E * 3/2004 Hoffmann et al. ....... 310/316.03

FOREIGN PATENT DOCUMENTS

| JP | 03-289362 A | | 12/1991 |
|---|---|---|---|
| JP | 06-276608 | * | 3/1993 |
| JP | 06-276608 | * | 9/1994 |
| JP | 06-276608 A | | 9/1994 |
| JP | 11-215605 | * | 1/1998 |
| JP | 11-215605 A | | 8/1999 |
| JP | 2004-222395 | * | 8/2004 |
| JP | 2004-222395 A | | 8/2004 |
| JP | 2005-027454 A | | 1/2005 |

* cited by examiner

*Primary Examiner* — Muhammad Shafi
(74) *Attorney, Agent, or Firm* — Buchanan Ingersoll & Rooney PC

(57) ABSTRACT

An electric vehicle control device comprises: a smoothing capacitor to be charged from a DC power supply via a charging resistor; an inverter converting a DC power having been charged in the smoothing capacitor to an AC power to supply it to a load; and a discharging switch causing a voltage having been charged in the smoothing capacitor to discharge via a discharging resistor, and in which a resistor is used as both charging resistor and discharging resistor to simplify a circuit arrangement. In the electric vehicle control device, there are provided a main switch inserted into a main circuit to which a DC power is supplied from the DC power supply, and an auxiliary switch that is connected in parallel to the discharging switch, and is in inverted switching states with respect to the main switch.

4 Claims, 1 Drawing Sheet

CONTROL DEVICE OF ELECTRIC VEHICLES

BACKGROUND OF THE INVENTION

The present invention relates to an electric vehicle control device including—an inverter and, more particularly, to improvements in a discharge circuit of a smoothing capacitor.

In the conventional electric vehicles such as railroad vehicles or electric cars, an inverter is provided for converting DC to AC via a smoothing capacitor from a DC power supply; outputs obtained from this inverter are fed to an AC motor being a load, to make power running; and an electric power generated by the AC motor is converted to DC with the above-mentioned inverter to make regenerative breaking in which a DC power supply is regenerated with this DC or dynamic braking in which this DC is consumed in a control circuit. Therefore, a smoothing capacitor is connected in parallel to the above-mentioned inverter, and the above-mentioned capacitor is charged via a charging resistor at the time of power running and discharged via a discharging resistor at the time of dynamic breaking.

Attempts of using one resistor as both of the above-mentioned charging resistor and discharging resistor to simplify circuit arrangement have been conventionally proposed (refer to, for example, Patent Document 1 and Patent Document 2), and a prior art example is shown in FIG. 2. FIG. 2 is an example of circuit arrangement being applied to an electric car system in which two wheels are driven by an AC motor. In the drawing, reference numeral 1 designates a secondary battery acting as a DC power supply, numeral 2 designates a fuse interrupting a circuit under abnormal conditions, numeral designates a main circuit switch, and numeral 4 designates an inverter which is formed of, for example, three-phase transistor inverters, and to which both terminals a smoothing capacitor 5 is connected. Numeral 6 designates an AC motor, numeral 7 designates a differential gear, and numeral 8 designates wheels. Numeral 9 designates a charging switch connected in parallel to the above-mentioned main circuit switch 3, numeral 10 designates a resistor used as both a charging resistor and a breaking resistor, and numeral 11 designates a discharging switch, which may be formed of a semiconductor switching element.

Now, operations of this circuit are described in brief. At the time of initial charging, the main circuit switch 3 and the discharging switch 11 are open; and when the charging switch 9 is brought in a closed circuit in this state, the above-mentioned smoothing capacitor 5 is charged from the secondary battery 1 through the fuse 2, the charging switch 9, and the common resistor 10. After the charging has completed, the charging switch 9 is open, and the main circuit switch 3 is brought in a closed circuit to make power-running operation of the AC motor 6 through inverter operation. On the other hand, at the time of breaking an electric car, the inverter 4 is made to operate as a rectifier, and the secondary battery 1 is regenerated with an electric power via the above-mentioned main circuit switch 3 as the discharging switch 11 is in an open circuit.

When the secondary battery 1 is not regenerated with an electric power, the above-mentioned main circuit switch 3 is made open, and the discharging switch 11 is brought in a closed circuit; and a discharge circuit that is formed of the smoothing capacitor 5, the common resistor 10, and the discharging switch 11 is made to operate, to switch from regenerative breaking to dynamic breaking. However, in such a conventional electric vehicle control device, at the time of the above-mentioned dynamic breaking, the discharging switch 11 has to be in a closed circuit without fail to establish a discharge circuit of a smoothing capacitor.

However, in the case where the foregoing discharging switch 11 fails not to be in a closed circuit, no discharge circuit of the above-mentioned smoothing capacitor is formed, and thus the above-mentioned smoothing capacitor cannot make any discharge, resulting in a problem of occurring any trouble in breaking the electric vehicle. In such a case, the electric vehicle has to be stopped only by mechanical breaking, which may be thought to be the cause of accidents, e.g., at the time of traveling on the slope.

Moreover, in the case where this system is used in electric vehicles for railroad, the above-mentioned smoothing capacitor 5 is charged to come to about an overhead wire voltage (approximately 1500V) supplied from an overhead contact line. On the supposition that discharging cannot be made due to defects of the discharging switch 11, there are some cases of extremely dangerous also at the time of inspection and repair works.

Patent Document 1: Japanese Patent Publication (unexamined) No. 289362/1991

Patent Document 2: Japanese Patent Publication (unexamined) No. 276608/1994

BRIEF SUMMARY OF THE INVENTION

The present invention was made in view of the above-described backgrounds, and has an object of securing a discharge circuit of a smoothing capacitor by a simple arrangement even if any defect of a discharging switch occurs in an electric vehicle control device in which a resistor is used as both charging resistor or discharging resistor to simplify circuit arrangement.

An electric vehicle control device according to this invention comprises: a smoothing capacitor to be charged from a DC power supply via a common resistor; an inverter converting a DC power having been charged in this smoothing capacitor to an AC power to supply it to a load; and a discharging switch causing a DC voltage having been charged in the mentioned smoothing capacitor to discharge via the mentioned common resistor; the electric vehicle control device being characterized in that there are provided a main switch inserted into a main circuit to which a DC power is supplied from the mentioned DC power supply, and an auxiliary switch that is connected in parallel to the mentioned discharging switch, and is in inverted switching states with respect to the mentioned main switch.

Effects of the Invention

According to the invention, it comes to be possible to reliably cause a smoothing capacitor to discharge even if any defect of the discharging switch occur, resulting in an advantage that improvements in reliability and safety of the electric vehicle control device can be exactly achieved.

DETAILED DESCRIPTION OF THE INVENTION

Figure 1:
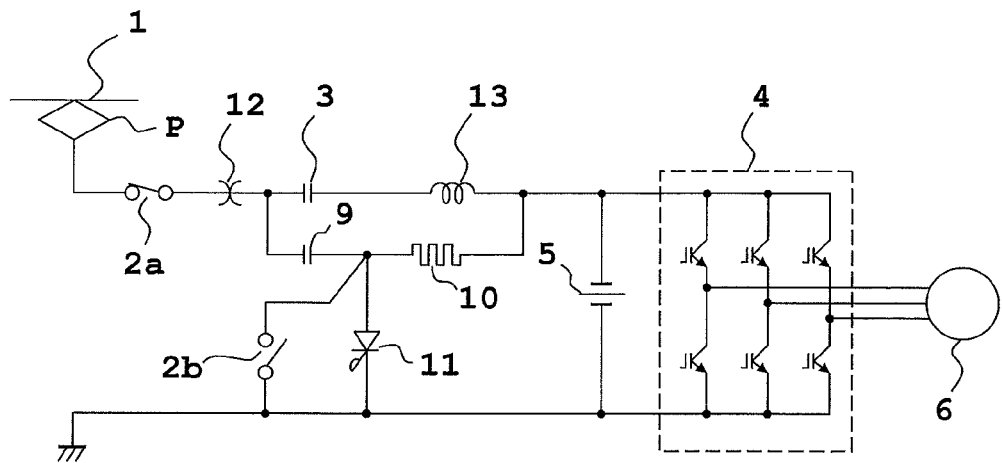
FIG. 1 shows an example of an arrangement of an electric vehicle control device carried out for a railroad vehicle according to a first preferred embodiment of the present invention.

Embodiment 1.

A preferred embodiment of an electric vehicle control device according to the present invention is hereinafter described with reference to the drawing.

Figure 2:
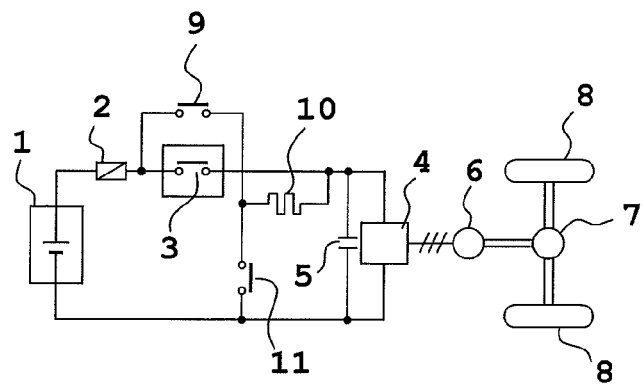
FIG. 2 shows an example of an arrangement being used in a conventional electric car system.

FIG. 1 illustrates an example of a construction of an electric vehicle control device carried out in a railroad vehicle according to a first embodiment of the invention. The same reference numerals show the same or like parts to those in the conventional construction example described referring to FIG. 2. In the drawing, reference numeral 1 designates an overhead contact line, and a DC power is supplied via a pantograph P. Numeral 2a designates a main switch that is inserted at the first part of the above-mentioned DC power supply circuit, and functions to bring the above-mentioned supply circuit electrically in a fully open circuit.

Numeral 2b designates an auxiliary switch connected in parallel to a discharging switch 11, and this auxiliary switch is arranged in such a relation as to be open when the above-mentioned main switch 2a is closed, and to be closed when the above-mentioned main switch 2a is open. The above-mentioned main switch 2a and auxiliary switch 2b are arranged so as to be in inversion operation with each other through, e.g., electromagnetic contactors not shown. Numeral 12 designates a high-speed circuit breaker inserted in the stage next to the above-mentioned main switch 2a, and this high-speed circuit breaker corresponds to a fuse 2 described referring to FIG. 2. From this circuit breaker, the line is branched into a series circuit between a main circuit contactor 3 and a filter reactor 13, and another series circuit between a charging contactor 9 and a common resistor 10. The above-mentioned discharging switch 11 is inserted between a connection point of the above-mentioned charging switch 9 and common resistor 10, and the ground, and employs, for example, a semiconductor element equipped with a control electrode. Numeral 5 designates a smoothing capacitor, numeral 4 designates a three-phase transistor inverter, and numeral 6 designates an AC motor.

Now, operations of the above-mentioned electric vehicle control device for railroad vehicles are described. First, the main switch 2a is short-circuited. At this time, the auxiliary switch 2b will be open. Then, the high-speed circuit breaker 12 is short-circuited, and thereafter the charging contactor 9 is short-circuited. At this time, a DC voltage having been fed from the overhead contact line 1 via a pantograph P is applied to the common resistor 10 via the main switch 2a, the high-speed circuit breaker 12, and the charging contactor 9, thus the smoothing capacitor 5, which is connected thereto, is charged.

Then, when the DC voltage having been charged in the smoothing capacitor 5 reaches a predetermined value, the charging contactor 9 is made to be open, and the main circuit contactor 3 is short-circuited. The above-mentioned voltage is set to be such a value as there is no occurrence of damping in current flowing when the main circuit contactor 3 is short-circuited due to resonance voltage with an electrostatic capacity value of the smoothing capacitor 5 and inductance value of the filter reactor 13.

Thereafter, the DC power having been supplied via the pantograph P will directly charge the smoothing capacitor 5 via the main circuit contactor 3 and the filter reactor 13.

Subsequently, switching elements forming the inverter 4 make an inverter switching operation, and the AC motor 6 is rotated, thus enabling the so-called power running. When the voltage of the smoothing capacitor 5 reaches a predetermined value that is set to be not more than the withstand voltage of the switching elements forming the inverter 4 at the time of power running of the above-mentioned AC motor 6, the above-mentioned discharging switch 11 comes to be in the conducting state, and the voltage having been charged in the smoothing capacitor 5 will be discharged via the common resistor 10. In this manner, the normal dynamic breaking will be made.

However, in the case where dielectric breakdown of the above-mentioned discharging switch 11 occurs due to, for example, over-voltage application, the above-mentioned discharging switch 11 will be in the non-conducting state, resulting in not causing the above-mentioned smoothing capacitor 5 to discharge. Since the smoothing capacitor 5 is in the state of being charged with the voltage of approximately 1500V as described above, if nothing is done, there is no means for causing the smoothing capacitor 5 to discharge, thus coming to be in the exceedingly dangerous state at the time of carrying out inspection and repair works.

According to this first embodiment of the invention, there is provided in parallel to the above-mentioned discharging switch 11 an auxiliary switch 2b, which is brought in the inverted switching state with respect to the main switch 2a. Therefore, in such a case, upon opening the main switch 2a, the auxiliary switch 2b is immediately brought in a closed circuit, thus enabling the formation of a discharge circuit of the above-mentioned smoothing capacitor 5 through the auxiliary switch 2b. As a result, even in the case where the discharging switch 11 is not in the conducting state due to defect of the discharging switch 11, since the smoothing capacitor 5 is surely caused to discharge via the auxiliary switch, it is possible to improve safety and reliability of system.

Furthermore, according to this first embodiment of the invention, an advantage also exists in that improved safety and reliability can be achieved by simple and inexpensive means of only adding to the main switch 2a having been conventionally used the auxiliary switch 2b, which is in inverted switching states with respect to the main switch 2a. In addition, since this auxiliary switch 2b is connected in parallel to the discharging switch 11, the above-mentioned common resistor 10 can be utilized upon operation of the auxiliary switch 2b, so that there is no need of particularly preparing any discharging resistor.

The invention claimed is:

1. An electric vehicle control device comprising: a smoothing capacitor to be charged from a DC power supply via a common resistor; an inverter converting a DC power having been charged in said smoothing capacitor to an AC power to supply it to a load; and a discharging switch causing a DC voltage having been charged in said smoothing capacitor to discharge via said common resistor; a main switch inserted into a main circuit to which a DC power is supplied from said DC power supply, and an auxiliary switch that is connected in parallel to said discharging switch and is in inverted switching states with respect to said main switch.

2. The electric vehicle control device according to to claim 1, further including a charging contactor forming a charge circuit in which said smoothing capacitor is charged from said DC power supply via a common resistor at the start of operation.

3. The electric vehicle control device according to claim 1, further including a main circuit contactor detecting that said smoothing capacitor has been charged to a level of a predetermined voltage, to form a charge circuit in which said common resistor is bypassed and said smoothing capacitor is charged from said DC power supply via a filter reactor.

4. The electric vehicle control device according to claim 2, wherein said discharging switch is a semiconductor switching element, and is connected between a connection point of said charging contactor and common resistor, and a ground terminal.

\* \* \* \* \*